United States Patent
Sakoda et al.

(10) Patent No.: US 6,411,662 B1
(45) Date of Patent: Jun. 25, 2002

(54) COMMUNICATION TERMINAL DEVICE, CELLULAR RADIO COMMUNICATION SYSTEM, AND INFORMATION COMMUNICATION METHOD

(75) Inventors: Kazuyuki Sakoda, Tokyo; Mitsuhiro Suzuki, Chiba, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/179,263

(22) Filed: Oct. 26, 1998

(30) Foreign Application Priority Data

Oct. 31, 1997 (JP) .............................. 9-301338

(51) Int. Cl.⁷ ............................................. H04L 27/06
(52) U.S. Cl. ...................... 375/340; 375/227; 375/260; 370/330; 370/343
(58) Field of Search .................. 370/331, 332, 370/330, 436, 343; 455/436, 437; 375/227, 279, 324, 340, 260

(56) References Cited

U.S. PATENT DOCUMENTS

| | | | | |
|---|---|---|---|---|
| 4,835,790 A | * | 5/1989 | Yoshida et al. ............. | 375/227 |
| 5,200,957 A | * | 4/1993 | Dahlin ....................... | 370/331 |
| 5,214,675 A | * | 5/1993 | Mueller et al. ............. | 375/340 |
| 5,214,687 A | * | 5/1993 | Kansakoski et al. ........ | 455/425 |
| 5,285,447 A | * | 2/1994 | Hulsebosch ................. | 370/332 |
| 5,379,324 A | * | 1/1995 | Mueller et al. ............. | 375/340 |
| 5,493,563 A | * | 2/1996 | Rozanski et al. ........... | 370/332 |
| 5,548,582 A | * | 8/1996 | Brajal et al. ................ | 370/206 |
| 5,581,548 A | * | 12/1996 | Ugland et al. .............. | 370/330 |
| 5,907,583 A | * | 5/1999 | Sakoda et al. .............. | 375/260 |
| 6,021,125 A | * | 2/2000 | Sakoda et al. .............. | 370/345 |
| 6,028,894 A | * | 2/2000 | Oishi et al. ................. | 375/227 |
| 6,044,106 A | * | 3/2000 | Suzuki ....................... | 375/219 |
| 6,108,321 A | * | 8/2000 | Anderson et al. ........... | 370/329 |

* cited by examiner

Primary Examiner—Stephen Chin
Assistant Examiner—Shuwang Liu
(74) Attorney, Agent, or Firm—Oblon, Spivak, McClelland, Maier & Neustadt, P.C.

(57) ABSTRACT

The present invention relates to a communication terminal device, a cellular radio communication system, and an information communication method, and measures the reception conditions of control information at a higher degree of accuracy. The present invention can measure the reception conditions $S10$ from the control information $S_{CCH}$ at a higher degree of accuracy by receiving a transmission signal $S5$ of the information symbol groups composed of the control information $S_{CCH}$ transmitted through a predetermined frequency channel CCH, demodulating the reception signal $S6$ to extract noise components ($S15$, $S20$) separated from signal components by comparing the control information $S_{CCH}$ with reference information $S_{ref}$ used as a reference for comparison, and measuring the reception condition $S10$ of only the signal components $S33$ of the transmission signal $S5$ based on the noise components ($S15$, $S20$).

33 Claims, 9 Drawing Sheets

COMMUNICATION TERMINAL DEVICE, CELLULAR RADIO COMMUNICATION SYSTEM, AND INFORMATION COMMUNICATION METHOD

BACKGROUND OF THE INVENTION

1. Field of the Invention

The present invention relates to a communication terminal device, a cellular radio communication system, and an information communication method, and for example, to those suitable for application to a communication terminal device, a cellular radio communication method, and an information radio communication system for mobile telephone.

2. Description of the Related Art

In a prior cellular radio communication system, an area in which communication services are provided is divided into cells of a predetermined size, and a base station is provided in each cell as a stationary station. Accordingly, this system allows a communication terminal device as a mobile station to communicate with a base station which seems to assure the best communication conditions. For this purpose, various systems and schemes have been developed for communication between communication terminal devices and base stations and among them, a typical one is the TDMA (Time Division Multiple Access) scheme.

The TDMA scheme is designed to form time slots by time-dividing a frequency channel and to transmit transmission signals at timings synchronized with time slots allocated to the home station. That is, this scheme allows a plurality of communication operations (so-called multiplex operation) to be performed at the same frequency channel so that available frequencies can be saved efficiently.

In the cellular radio communication system, a service area is divided into a plurality of cells and a base station is provided in each cell so that a mobile station which moves within the service area can communicate with the base station of any cell located within that service area. If the mobile station communicates within the service area of this cellular radio communication system, it selects such a base station that seems to assure the best communication conditions, performs the handoff process to switch the connection from the previous base station to the newly selected base station, and then communicates user information such as audio signals with the selected base station. This handoff process can also keep good communication conditions by switching base stations in sequence even when the mobile station moves from one cell to another.

To perform the handoff process, in fact, it is always required to know "which base station should be connected to the mobile station" even during communication. In the cellular radio communication system, the mobile station usually receives control channel (hereinafter referred to as a control channel) signals transmitted by each base station and measures the power of each reception signal. Then the base station which transmits a signal of the highest power is determined as a possible base station for handoff. Accordingly, such determination of base stations for handoff is made principally by the mobile station.

However, the decision whether to actually perform the handoff process or not is made by the base station. Therefore, the handoff process consists of the steps of "the mobile station searching for a possible base station for handoff" and "the possible base station performing the handoff process as a result of the search". That is, the base station continuously monitors to determine whether the power received from the currently communicating communication terminal device is sufficient and if satisfactory communication quality cannot be achieved because of insufficient power, it is determined that the mobile station should be handed off from the current base station to another base station. Then the current base station is caused to perform the handoff process between the next base station which is notified of by the mobile station. On the contrary, the mobile station itself requests the handoff process when the power received from the base station decreases. However, the decision whether to perform the handoff process or not is finally made by the base station again.

As shown in FIG. 1, when time slots of transmission time and frequency for a time-divided control channel CCH are allocated uniquely to each base station in the cellular radio communication system according to the TDMA scheme, the mobile station can measure the reception conditions such as path loss (so-called transmission line loss) more easily than the received power described above by receiving the control channel CCH of a desired base station to measure the received power of control channel signals.

As shown in FIG. 2, when time slots of transmission time and frequency for a control channel CCH of each base station are not allocated uniquely to each base station in the cellular radio communication system according to the TDMA scheme, a signal wave (for example, traffic channel TCH1) for the traffic channel (so-called user information channel) TCH of another base station, appears as a strong interference wave on the same frequency channel as a control channel CCH1 of the base station which decided to receive it. In such a case, the power of control channel signals received from the base station cannot be measured accurately by measuring the received power of the selected control channel CCH1 because the received power contains noise components introduced by the interference wave and consequently, it should be very difficult to measure the path loss.

SUMMARY OF THE INVENTION

In view of the foregoing, an object of the present invention is to provide a communication terminal device, a cellular radio communication system, and an information communication method which can measure the reception conditions at a higher degree of accuracy by eliminating any influence of interference waves from received control channel signals.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
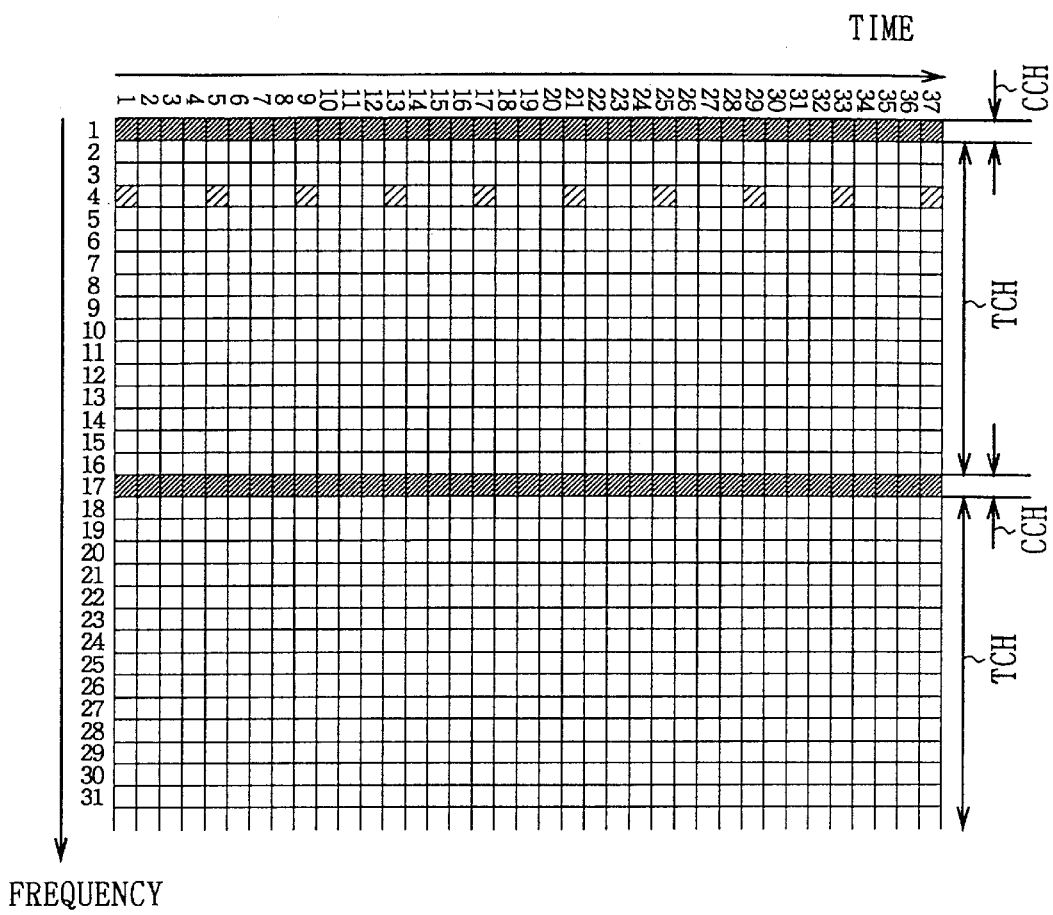
FIG. 1 is a schematic diagram showing the channel configuration of a cellular radio communication system.
Figure 2:
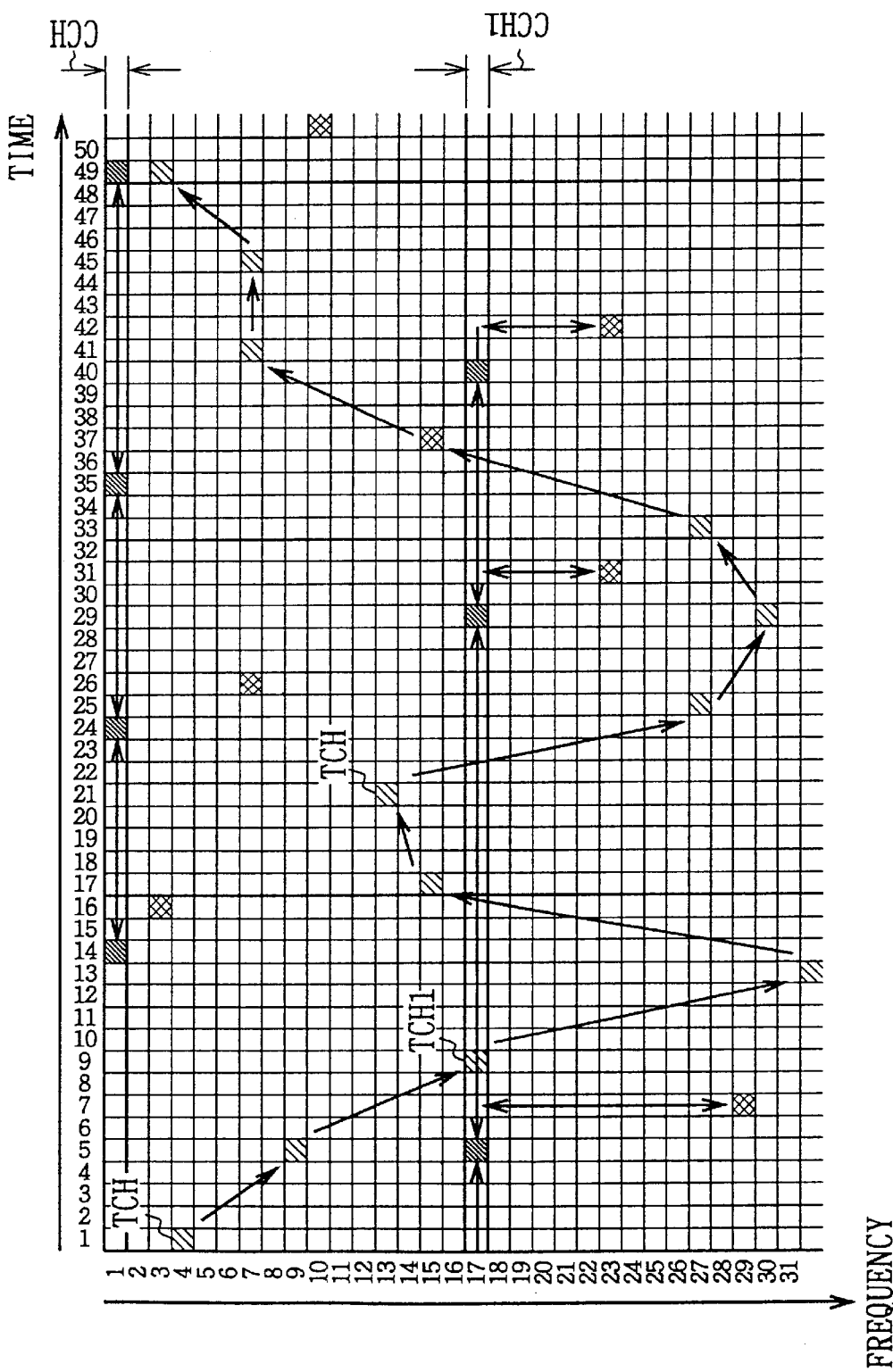
FIG. 2 is a schematic diagram showing the channel configuration of a time-division cellular radio communication system.
Figure 3:
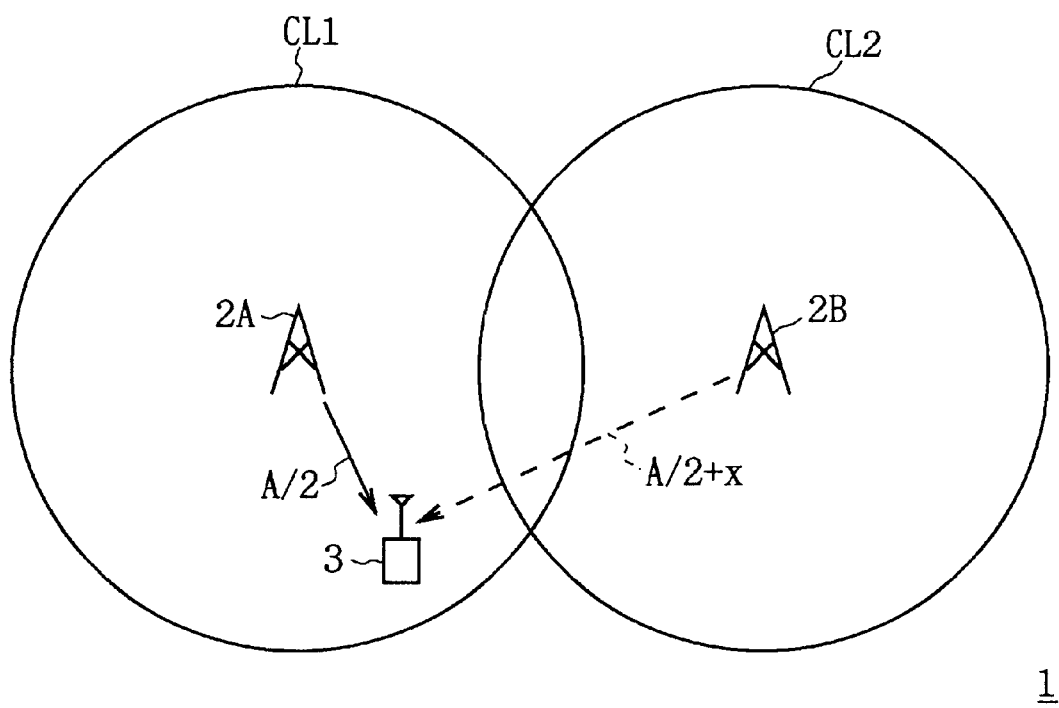
FIG. 3 is a schematic diagram showing the configuration of a cellular radio communication system according to the present invention.

Preferred embodiments of the present invention will be described with reference to the accompanying drawings:
(1) First Embodiment
(1-1) Overall Configuration of Radio Communication System In FIGS. 3 and 4, the reference numeral 1 shows in whole a cellular radio communication system, for example, a mobile telephone, to which the present invention is applied. Also for this cellular radio communication system, an area in which communication services are provided is divided into cells CL1 and CL2 of a desired size and base stations 2A and 2B are provided in the cells as stationary stations, respectively, so that a mobile telephone 3 provided as a mobile station can communicate with a base station which seems to assure the best communication conditions.

In this cellular radio communication system 10, the communication is established between the base station 2A or 2B and the mobile telephone 3 not only through the TDMA scheme but through frequency hopping which is a technique for switching the frequency of a communication channel (hereinafter referred to as a traffic channel) used for transmission and reception for each slot in sequence. This always allows the system to avoid cochannel interference and to prevent interference waves from interfering with the communication.

In the radio system of this system, the base stations 2A and 2B and the mobile telephone 3 usually monitor the power (or quality of a reception signal) received from each other to keep a good communication condition for desired communication. A feedback loop is formed by notifying each other of the results from monitoring and thus an optimal base station to which the mobile telephone 3 is to be handed off can be selected.

That is, when the mobile telephone 3 which is a mobile station in the cellular radio communication system 1 moves within a service area, the path loss (the loss in a path) to the base station should change accordingly. When the mobile telephone 3 moves during the communication with, for example, the base station 2A, the path loss to the base station 2A changes from time to time and therefore, the transmission power also changes. Of course, if the path loss increases to such an extent that the good communication condition cannot be kept, the mobile telephone 3 should be handed off from the currently communicating base station 2A to another base station.

Figure 4:
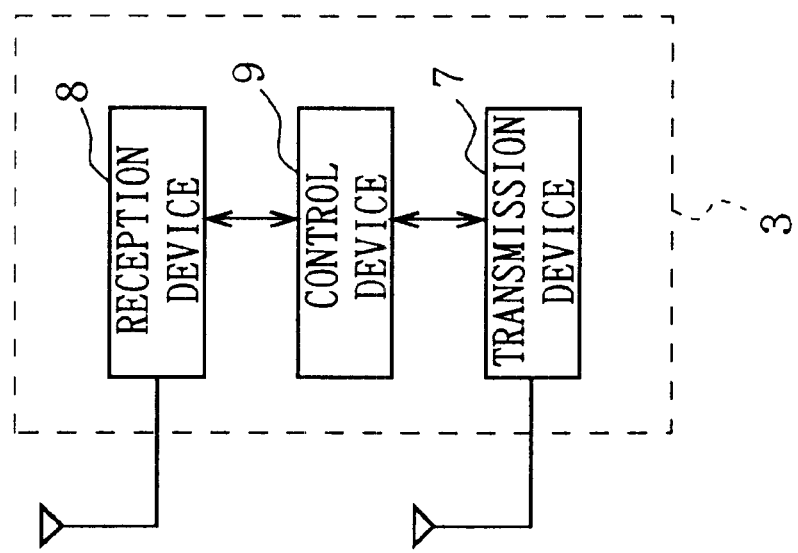
FIG. 4 is a block diagram showing the configuration of a base station and a mobile telephone according to the present invention.
Figure 4:
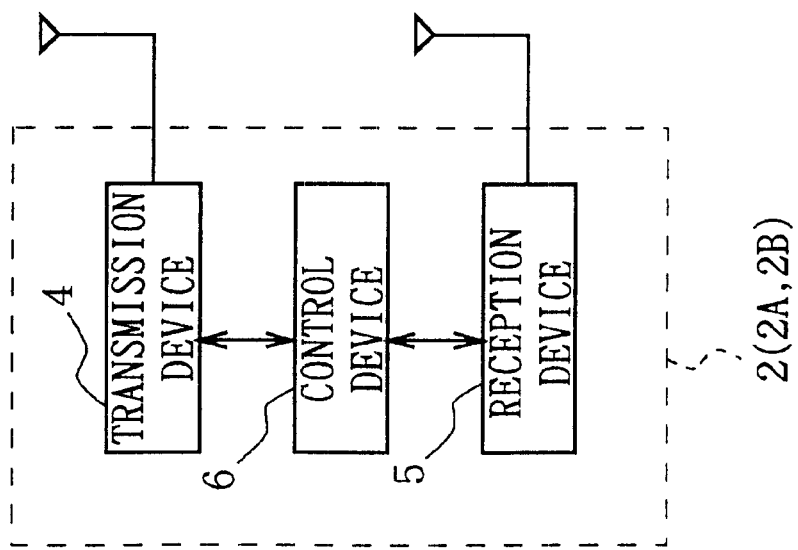

As shown in FIG. 4, the base station 2 (2A or 2B) comprises a transmission device 4 for transmitting information bit strings toward the mobile telephone 3 with a predetermined frequency channel, a reception device 5 for receiving the information bit strings transmitted from the mobile telephone 3 with a predetermined frequency channel, and a control device 6 for controlling the operations of the transmission device 4 and the reception device 5. Similarly, the mobile telephone 3 comprises a transmission device 7 for transmitting information bit strings toward the base station 2 with a predetermined frequency channel, a reception device 8 for receiving the information bit strings transmitted from the base station 2 with a predetermined frequency channel, and a control device 9 for controlling the operations of the transmission device 7 and the reception device 8.

The radio communication system 1 has a plurality of frequency channels used for communication between the base station 2 and the mobile telephone 3. Among them, a pair of frequency channels are used for communication from the base station 2 to the mobile telephone 3 and for communication from the mobile telephone 3 to the base station 2 through time-division technology. Each frequency channel consists of, for example, 24 subcarriers and, during the communication, the information bit strings are transmitted through so-called multicarrier communication by dividing them onto these subcarriers and then superimposing them. Specifically, the radio communication system 1 divides the information bit strings into slots and the divided information bit strings are transmitted on the above-mentioned subcarriers and then superimposed.

Now, the transmission devices 4 and 7 and the reception devices 5 and 8 provided in the base station 2 and the mobile telephone 3, respectively, are described below in detail. It should be appreciated that only the transmission device 4 and the reception device 8 are described here, because the transmission devices 4 and 7 have an identical configuration and the reception devices 5 and 8 have an identical configuration.

(1-2) Configuration of Transmission Device

Figure 5:
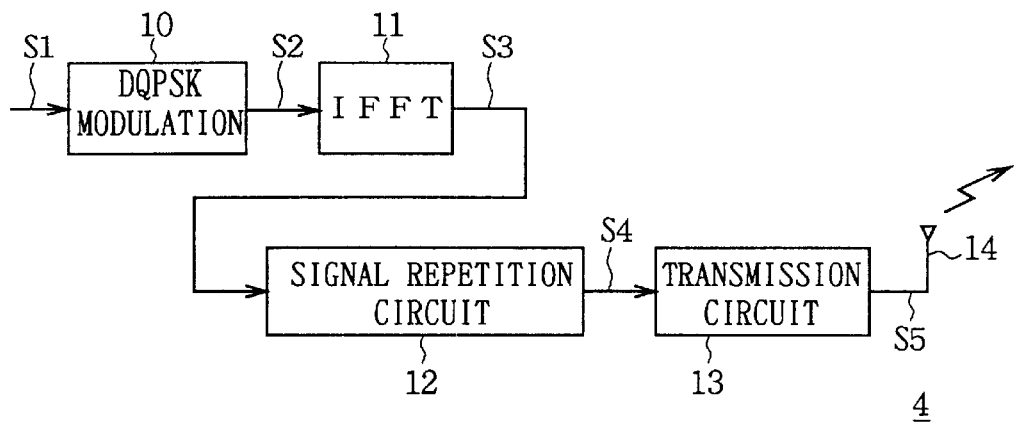
FIG. 5 is a block diagram showing the configuration of a transmission device according to the present invention.

This section describes the configuration of the transmission device 4 provided in the base station 2. As shown in FIG. 5, the transmission device 4 consists of mainly a modulation circuit 10, an inverse fast Fourier transform circuit (IFFT) 11, a signal repetition circuit 12, a transmission circuit 13, and an antenna 14.

The transmission device 4 can transmit a traffic channel signal $S_{TCH}$ and a control channel signal $S_{CCH}$. Now the, operation of the transmission device 4 when transmitting a control channel signal $S_{CCH}$ which contains information for time-divisional measurement of the received power is described below.

First, in the transmission device 4, an encoded bit group S1 of a control channel signal $S_{CCH}$ which is divided into time slots is supplied to the modulation circuit 10 at a predetermined transmission timing.

The modulation circuit 10 performs an asynchronous detection operation, for example, a DQPSK (Difference Quadrature Phase Shift Keying) modulation operation on the received encoded bit group S1.

In the radio communication system 1, each time slot is transmitted through time-division technology and a frequency channel consists of, for example, 24 subcarriers. During the communication, the information bit strings for transmission are divided into slots and transmitted on these subcarriers and then superimposed. That is, so-called multicarrier communication is performed wherein a plurality of carriers are used to transmit the information bits simultaneously.

The modulation circuit 10 performs the DQPSK modulation operation on the encoded bit group S1 and provides a resulting transmission symbol group S2 to the succeeding inverse fast Fourier transform circuit 11.

The inverse fast Fourier transform circuit 11 divides the symbols of the transmission symbol group S2 onto 24 subcarriers as described above and then superimposes them (transmits the symbols of the transmission symbol group S2 arranged on the frequency axis side by side). Thus, the transmission symbol group S2 is subjected to the inverse Fourier transform operation. A resulting signal is obtained as if the symbol group provided on the time axis is rearranged onto the frequency axis.

The inverse fast Fourier transform circuit 11 performs a so-called windowing operation on the transmission symbol group S2 before the inverse Fourier transform operation, so that out-band spurious components can be suppressed. Specifically, the windowing operation can be accomplished by passing the transmission symbol group S2 through a cosine roll off filter on the time axis. A transmission symbol group S3 generated by the inverse fast Fourier transform circuit 11 is provided to the succeeding signal repetition circuit 12.

Figure 6:
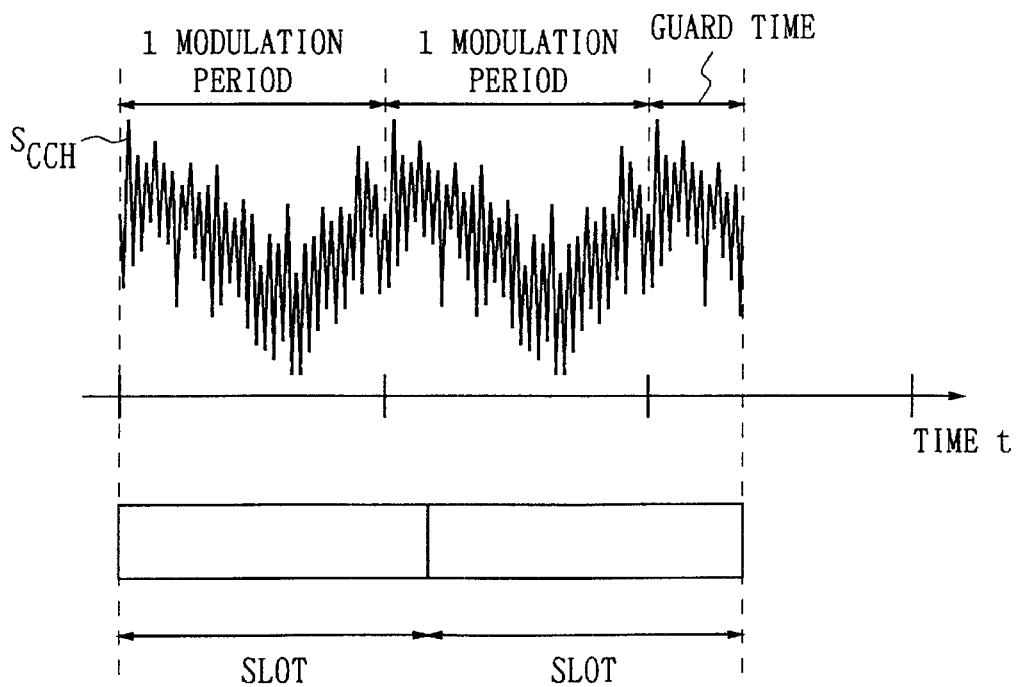
FIG. 6 is a schematic diagram for explaining a control channel signal.

As shown in FIG. 6, the signal repetition circuit 12 repeats the transmission symbol group S2 of the control channel signal $S_{CCH}$ provided by the inverse fast Fourier transform circuit 11 over 2 time slots and then generates a control symbol string of the control channel signal $S_{CCH}$ by appending the leading portion of the control channel signal $S_{CCH}$ corresponding to a guard time of each time slot to the end of the time slot. The generated control symbol string is provided to the succeeding transmission circuit 13.

After filtering the transmission symbol group S4, the transmission circuit 13 performs a digital-to-analog conversion operation on the transmission symbol group S4 to generate a transmission signal and performs a frequency conversion operation on the transmission signal to generate a transmission signal S5 of a predetermined frequency channel. This transmission signal is amplified to a predetermined power level and then transmitted through the antenna 14.

Thus, the transmission circuit 13 transmits the control channel signal $S_{CCH}$ which continues over 2 time slots, synchronously at the transmission timing of the time slot allocated to the home station through the control channel CCH by using the multicarrier communication technology.

The mobile telephone 3 at the receiving end requires a control channel signal $S_{CCH}$ of at least one period to demodulate the control channel signal $S_{CCH}$ transmitted from the base station 2 at the transmitting end. Since a control channel signal $S_{CCH}$ is transmitted over 2 time slots, even when the reception timing does not coincide at the receiving end and the received symbol string is multiplied by a phase revolution component, a control channel signal $S_{CCH}$ of 1 time slot can be received within the 2 time slots by performing a windowing operation at a usual timing.

When the mobile telephone 3 at the receiving end receives a control channel signal $S_{CCH}$ through a random access channel, demodulation of the signal does not require such prior minute-period windowing. Like ordinary messages synchronous between the receiving and transmitting ends, the control channel signal $S_{CCH}$ can be securely received and demodulated by merely performing the demodulation operation periodically. Therefore, wasteful demodulation operations can be eliminated to reduce the throughput remarkably.

(1-3) Configuration of Reception Device

This section describes the configuration of the reception device 8 provided in the mobile telephone 3.

Figure 7:
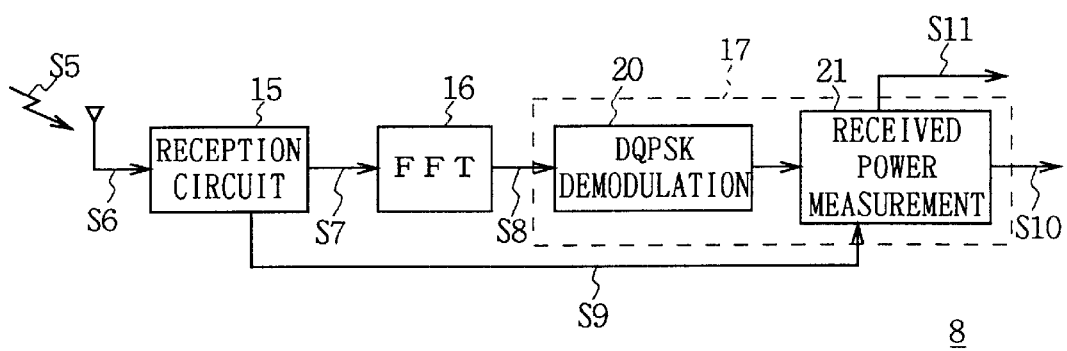
FIG. 7 is a block diagram showing the configuration of a reception device according to the first embodiment.

As shown in FIG. 7, the reception device 8 consists of mainly a reception circuit 15, a fast Fourier transform circuit (FFT) 16, and a demodulation circuit 17 and receives the transmission signal S5 transmitted from the transmission device 4 to accept a resulting reception signal S6 in the reception circuit 15.

The reception circuit 15 amplifies the accepted reception signal S6 and performs a frequency conversion operation on the reception signal S6 to extract a baseband signal. Then the reception circuit 15 filters the baseband signal and performs an analog-to-digital conversion operation on the gain-controlled baseband signal to generate a reception symbol group S7 of a DQPSK-modulated digital signal. Then the reception symbol group S7 is provided to the fast Fourier transform circuit (FFT) 16.

The fast Fourier transform circuit 16 performs a so-called windowing operation on the reception symbol group S7 to extract signal components of 1 slot and then performs a Fourier transform operation on the extracted signal components. Thus, the symbols of the reception symbol group which have been arranged on the frequency axis side by side during the extraction, can be rearranged on the time axis. After the Fourier transform operation, the fast Fourier transform circuit 16 separates the control channel signal $S_{CCH}$ from a traffic channel signal and provides to the succeeding demodulation circuit 17 a control channel symbol group S8 arranged on the time axis. It should be appreciated that the fast Fourier transform circuit 16 accomplishes a windowing operation by passing the reception symbol group S7 through a cosine roll off filter on the time axis, so that any interference between symbols in a slot can be suppressed.

In the demodulation circuit 17, a DQPSK demodulation circuit 20 performs on the reception symbol S8 a difference quadrature phase shift keying demodulation operation corresponding to the DQPSK modulation operation performed at the transmitting end. Thus the reception symbol group S8 is demodulated and provided to the succeeding received power measurement circuit 21. The received power measurement circuit 21 further receives from the reception circuit 15 the reception signal power S9 of an RF (Radio Frequency) signal which has not been gain-controlled.

The received power measurement circuit 21 extracts a desired wave signal component from the reception symbol group S8 provided for each slot and extracts also a noise component as opposed to the desired wave signal component. Then the circuit obtains the power ratios of the desired wave signal component and the noise component, respectively, to calculate the power value of a desired wave signal component in the reception signal power S9 using these power ratios.

(1-4) Configuration of Demodulation Circuit

Figure 8:
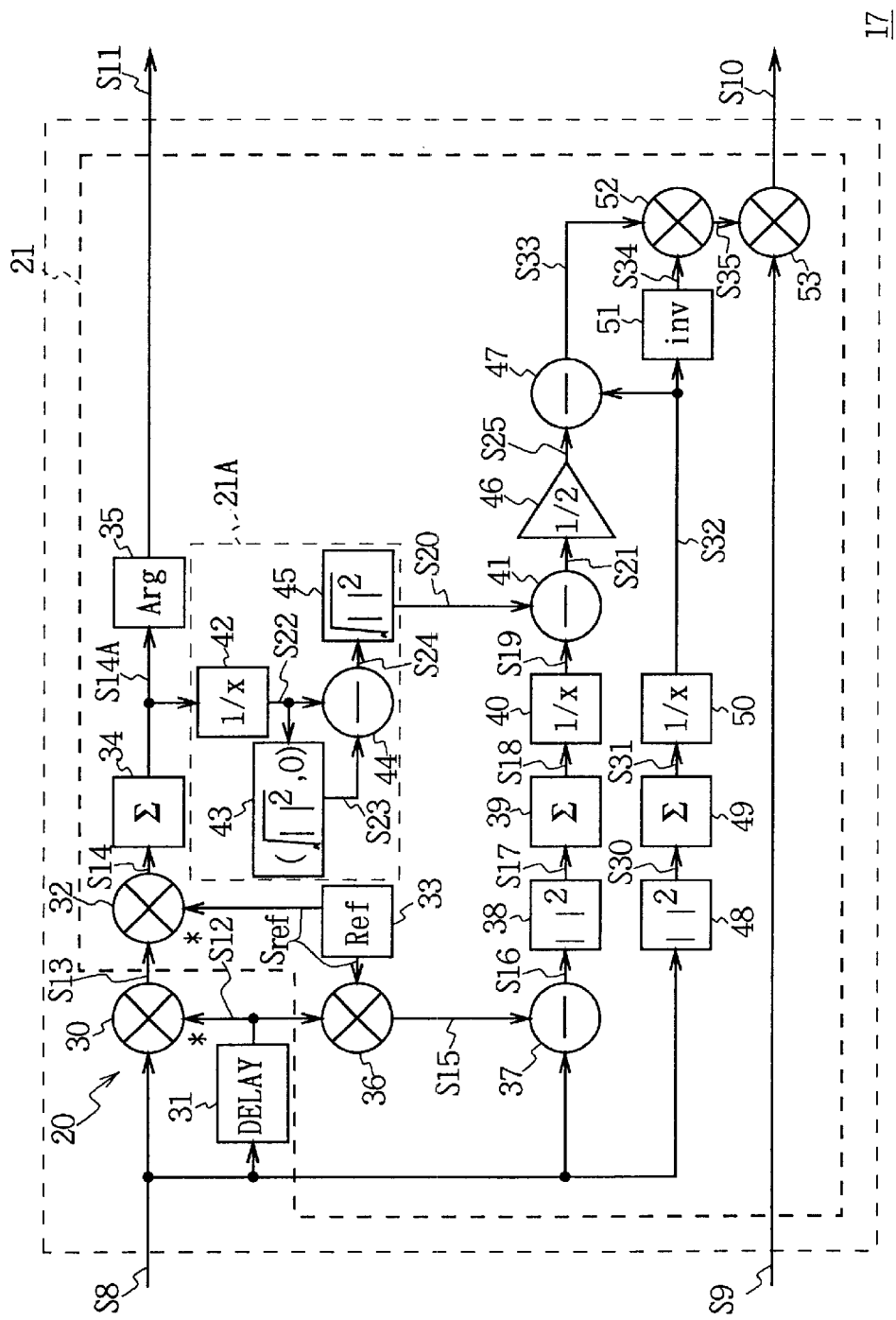
FIG. 8 is a block diagram showing the configuration of a demodulation circuit shown in FIG. 7.

Next, referring to FIG. 8, the demodulation circuit 17 is described below in detail. As shown in FIG. 8, the demodulation circuit 17 receives from the fast Fourier transform circuit 16 the reception symbol group S8 composed of the encoded bit group of a complex signal for each slot. First, the demodulation circuit 17 accepts the reception symbol group S8 into both a multiplier 30 which constitutes the DQPSK demodulation circuit 20 and a delay circuit 31. The multiplier 30 complex-multiplies the reception symbol S8 received from the inverse fast Fourier transform circuit 11 by a conjugate value (which is shown by "*" in the figure) of a reception symbol S12 with a 1-symbol delay provided from the delay circuit 31 to extract a reception symbol S13. It should be appreciated that the reception symbol S13 extracted through this multiplication is QPSK-modulated symbol information.

The reception symbol S13 extracted by the multiplier 30 is provided to a multiplier 32 of the received power measurement circuit 21, which complex-multiplies the reception symbol S13 by a conjugate value of a reference $S_{ref}$ read out from a reference storage circuit (Ref) 33 to produce a quotient obtained from the reception symbol S13 being divided by the reference $S_{ref}$.

It should be appreciated that the reference $S_{ref}$ is an estimated value of signal constellation which indicates the amplitude and phase of the control channel signal $S_{CCH}$ previously transmitted from the base station 2 through the control channel CCH. That is, the reference $S_{ref}$ has the same symbol as that for the control channel signal $S_{CCH}$ transmitted from the transmitting end through the control channel CCH and has an amplitude value of "1" and the same phase value as that of the control channel signal $S_{CCH}$. Therefore, the division operation of the multiplier 32 is fundamentally equivalent to the operation to return the phase value of the received reception symbol S13 to the original value of "0" and a symbol group S14 provided by the multiplier 32 should contain the symbols each having an amplitude value of "1" and a phase value of "0".

However, the reception symbol group S8 in fact contains some noise components because of noise or fading, influence of interference waves, or deviation of windowing by the fast Fourier transform circuit 16 and the received reception symbol group S8 does not coincide completely with the symbol information of the transmitted control channel signal $S_{CCH}$. Therefore, the symbol string S14 provided by the multiplier 32 is not always a symbol having an amplitude value of "1" and a phase value of "0".

Figure 9:
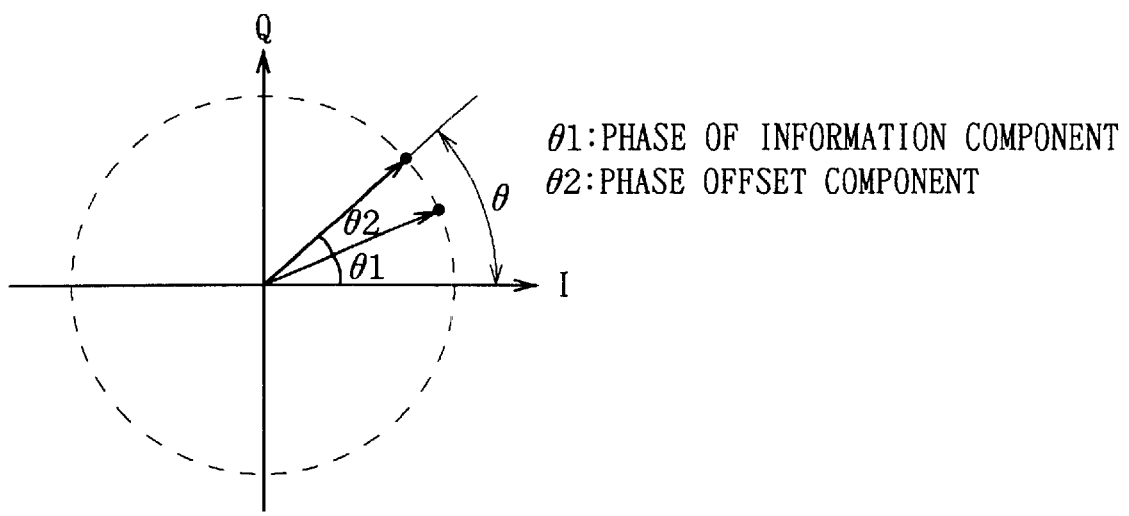
FIG. 9 is a schematic diagram for explaining a phase offset.

From this fact, characteristics of the transmission line such as noise superimposed on the reception symbol group S8 or fading, influence of interference waves, or deviation of windowing can be estimated by observing the symbol string S14 provided by the multiplier 32 to detect a phase offset θ2 of the phase θ1 of the information component of the symbol string as shown in FIG. 9.

The multiplier 32 provides the symbol string S14 to the succeeding first adder 34. The first adder 34 cumulatively adds the provided symbol string S14 for a slot. After the addition for a slot is finished, the cumulatively added sum S14A is provided to an amplitude normalization circuit (Arg) 35. The Arg 35 holds the phase of a complex number value of the provided symbol string S14A to generate the phase information S11 having a phase offset component with an amplitude of "1" and provides it to the control device 9 (FIG. 4). The phase offset can be detected for each slot accurately by the Arg 35 thus detecting a phase offset of the reception symbol group S8 from the reception symbol string S14A.

The control device 9 calculates the average of the provided phase information S11 for several slots to adjust the transmission/reception timing of the mobile telephone 3 by using the average as phase offset information.

Figure 10:
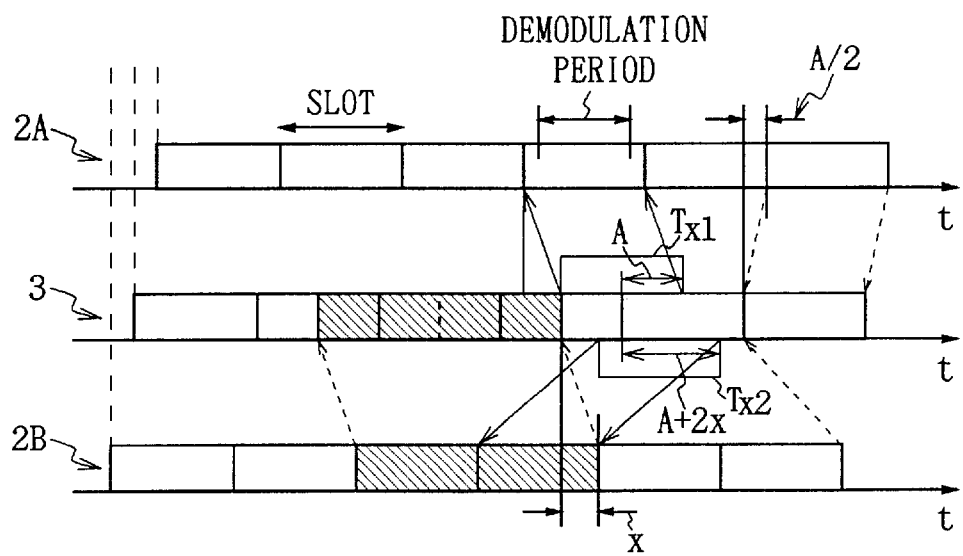
FIG. 10 is a timing chart for explaining a time alignment operation.

That is, the control device 9 calculates any incorrect transmission/reception timing based on the phase information S11 of the phase revolution component of the transmission signal S5 received from the base station 2 and measured by the reception device 8 and then performs a time alignment operation on any incorrect timing based on the calculation result. For example, as shown in FIG. 10, if a transmission signal is received by the mobile telephone 3 from the base station 2A at a reception timing with a deviation equal to the propagation delay (A/2), a time alignment operation for the transmission/reception timing can be accomplished by advancing the timing by a time A which is twice as long as the one-way propagation delay (A/2), taking into account the fact that the communication between the mobile telephone 3 and the base station 2A is two-way communication consisting of transmission and reception.

If a transmission signal is received by the mobile telephone 3 from another base station 2B at a reception timing with a deviation equal to a different propagation delay (X), a time alignment operation for the transmission/reception timing between the mobile telephone 3 and the base station 2B can be accomplished by advancing the transmission timing from the mobile telephone 3 and the base station 2A by a time (A+2X) which is twice as long as the sum of the former propagation delay (A/2) and the latter propagation delay (X). Therefore, such a time alignment for the transmission/reception timing can be easily accomplished based on the phase revolution component information of the reception signal S6.

In the demodulation circuit 17 (FIG. 8), the reception symbol S12 provided by the delay circuit 31 is supplied to a multiplier 36 of the received power measurement circuit 21, which complex-multiplies the reception symbol S12 by a conjugate value of a reference $S_{ref}$ read out from the reference storage circuit 33. Consequently, a symbol string S15 is generated and provided to a subtracter 37 and the phase value of the reception symbol S12 would be returned to "0" with the amplitude value of "1".

The subtracter 37 performs a subtraction operation between the actually received reception symbol S8 and the symbol string S15 which would have the phase value returned to "0" and the amplitude value of "1". A difference value obtained from the subtraction operation is a symbol string S16 which consists of the noise component contained in the reception symbol S8 and another noise component contained in the reception symbol immediately before the reception symbol S8. The subtracter 37 provides thus obtained symbol string S16 to a first square circuit 38.

The first square circuit 38 obtains a noise power S17 of the symbol string S16 by squaring the amplitude of a signal component of each symbol in the symbol string S16 and provides it to a second adder 39. The second adder 39 cumulatively adds the noise power S17 of each symbol provided by the first square circuit 38 except the leading symbol, because differential modulation is performed in the system. As a result, a noise power S18 which is a sum of the noise power values of all symbols constituting a slot is calculated and provided to the succeeding 1/x circuit 40.

The 1/x circuit 40 calculates an average noise power S19 for two symbols by dividing the noise power S18 for a slot by the number of symbols x for a slot and provides the noise power S19 to the succeeding subtracter 41. The subtracter 41 receives a phase component S20 of each symbol from a phase component extractor 21A and performs a subtraction operation between the phase component power S20 and the noise power S19 to extract a noise power S21 for a symbol with the phase revolution component power removed.

Now, the phase component extractor 21A which extracts the phase component of the reception symbol string S8 is described below. The phase component extractor 21A first receives at a 1/x circuit 42 a cumulative addition result. for a slot of the reception symbol string S14A provided by the first adder 34. The 1/x circuit 42 calculates an average reception symbol string S22 for a symbol by dividing the reception symbol string S14A by the number of symbols x for a slot and provides it to an amplitude calculation circuit 43 and a subtracter 44, respectively.

The amplitude calculation circuit 43 squares the provided reception symbol string S22 for each symbol and then obtains a square root of the square value. As a result, an amplitude component S23 which would have the same amplitude as that of the reception symbol string S22 and the phase component of "0" is generated and provided to the subtracter 44. The subtracter 44 performs a subtraction operation between the reception symbol string S22 and the amplitude component S23 to generate a phase revolution component S24 for two symbols and the phase revolution component S24 is provided to a power calculation circuit 45.

The power calculation circuit 45 calculates a phase power S20 of the phase revolution component S24 by squaring the phase revolution component S24 and obtaining a square root therefrom and provides it to the subtracter 41. From this operation, an average power for two symbols can be obtained by performing differential demodulation on a vector-added value of the reception symbol string S14A and provided to the subtracter 41.

As described above, the subtracter 41 receives the noise power S19 from the 1/x circuit 40 and the phase power S20 from the phase component extraction circuit 21A and performs a subtraction operation between the noise power S19 and the phase power S20 to obtain the noise power S21 for two symbols with the phase revolution component power removed (because the differential demodulation causes the value for the first symbol to be added through the cumulative addition).

Since the noise power S21 provided by the subtracter 41 is twice as much as the noise component power for a symbol, a noise power S25 for a symbol can be calculated by performing a half-time operation on the noise power S21 through a ½ circuit 46 and provided to the succeeding subtracter 47. The power value for only noise components contained in the reception symbol string S8 with any phase revolution component removed can be detected exactly, because the noise power S21 of the reception symbol string S8 is obtained by subtracting the phase power S20 from the noise power S19.

In addition, the demodulation circuit 17 does not perform the DQPSK demodulation on part of the reception symbol string S8 provided by the fast Fourier transform circuit 16 but directly receives it at a second square circuit 48 of the received power measurement circuit 21. The second square circuit 48 obtains a signal power S30 for each symbol of the reception symbol string S8 by squaring the amplitude of the reception symbol string S8 and provides the signal power S30 to a third adder 49. The third adder 49 cumulatively adds the signal power S30 of each symbol of the reception symbol string S8 provided by the second square circuit 48 to obtain a signal power S31 which is a sum of the signal power values of all symbols constituting a slot and to provide it to a 1/x circuit 50.

The 1/x circuit 50 calculates an average signal power S32 for a symbol with the number of symbols x for a slot of the reception symbol string S8 and provides it to the subtracter 47 and an inverse calculation circuit (inv) 51, respectively. It should be appreciated that the signal power S32 is a total signal power of the signal component and the noise component of the reception symbol S8.

The subtracter 47 performs a subtraction operation between the noise power S25 for a symbol of the reception symbol string S8 provided by the ½ circuit 46 and the signal power S32 for a symbol of the reception symbol string S8 provided by the 1/x circuit 50. From this operation, the signal power S33 for only signal components contained in the reception symbol string S8 with any noise power S25 removed can be calculated and provided to the succeeding multiplier 52.

The multiplier 52 receives from the inverse calculation circuit 51 an inverse S34 of the signal power S32 which consists of the signal component power and the noise component power and multiplies the inverse S34 by the signal power S33.

$$S \times \frac{1}{S+N} = \frac{S}{S+N} \quad (1)$$

As shown in the above equation, the ratio of the signal power (S) to the sum of the signal power (S) and the noise power (N) for each symbol, that is, the signal-to-noise power ratio S35 (S/(S+N)) is calculated. Then the multiplier 52 provides the signal-to-noise power ratio S35 to a multiplier 53 to multiply it by the reception signal power S9 of an RF signal which was provided by the reception circuit 15 but has not been gain-controlled. As a result, the reception signal power S10 for only signal components contained in the reception signal power S9 can be calculated.

$$P2=P1 \times (S/(S+N)) \quad (2)$$

In the above equation, the reception signal power S10 (P2) is calculated from the reception signal power S9 (P1).

Thus, the received power for signal components of a desired wave of the reception signal S6 can be obtained and then provided to the succeeding control device 9.

$$L0=P0/P2 \quad (3)$$

In the above equation, the path loss L0 of the reception signal can be calculated from the ratio between the transmission signal power P0 of the transmission signal S5 transmitted from the base station 2 and the reception signal power P2. It should be appreciated that the reception signal power S10 is obtained by averaging the values for several slots in the control device 9 and the reception signal power S10 and the path loss L0 are transmitted to the base station 2 by the transmission device 7. Therefore, based on the reception signal power and/or the path loss L0 calculated in the mobile telephone 3 as a mobile station, the base station 2 can find out at a higher degree of accuracy an optimal base station which should communicate with the mobile telephone 3, and then perform the handoff process quickly and properly.

(1-5) Operation and Effects of the First Embodiment

With the above configuration, the transmission device 4 in the base station 2 transmits to a mobile station the control channel signal $S_{CCH}$, which is control data used to measure the received power, as the transmission signal S5 at a predetermined time-divisional transmission timing through a predetermined control channel CCH. The reception device 8 in the mobile telephone 3 receives the control channel signal $S_{CCH}$ at a predetermined time-divisional reception timing.

It should be appreciated that the control channel signal $S_{CCH}$ to be transmitted from the base station 2 is formed by repeating over at least two time slots the control channel signal $S_{CCH}$ for a modulation period. If the mobile telephone 3 at the receiving end performs the windowing operation at a usual timing, the control channel signal $S_{CCH}$ for a period can be received securely even when the reception symbol string is multiplied by a phase revolution component at the receiving end because of inconsistent reception timings.

When the reception device 8 in the mobile telephone 3 receives the transmission signal S5, the reception circuit receives it as the reception signal S6 and performs frequency conversion, filtering, and analog-to-digital conversion operations on it to extract the reception symbol S7. Then the reception circuit 15 further performs a fast Fourier transform operation on the reception symbol S7 to extract the reception symbol S8 arranged on the time axis.

When a time lag occurs in the reception signal S6 due to superimposed noise components such as interference waves on the transmission line, fading, or deviation of windowing by the fast Fourier transform operation, the signal transmission/reception timing should deviate. Such a time lag appears as a phase revolution in the symbol demodulated by the Fourier transform operation. Therefore, the reception symbol S14 with a phase offset θ2 added to the phase θ1 for information of the reference $S_{ref}$ can be obtained by complex-multiplying the reception symbol S13 which is extracted through demodulation of the reception symbol S8 at the receiving end by a conjugate value of the reference $S_{ref}$ of the control channel signal $S_{CCH}$ read out from the reference storage circuit 33 (FIG. 9).

When thus obtained reception symbol string S14 is amplitude-normalized by the amplitude normalization circuit 35, the phase information S11 of the phase revolution component with the amplitude normalized can be generated for each slot. Therefore, transmission/reception with aligned timing with the base station 2 which transmits the newly received reception signal S6 can be accomplished based on the phase information S11 by providing the phase information S11 to the succeeding control circuit.

A subtraction operation between the symbol string S15 obtained by complex-multiplying the demodulated reception symbol S12 by the conjugate value of the reference $S_{ref}$ and the actually received reception symbol S8 which contains noise components such as interference waves can calculate only the noise component S16 of the reception symbol S8. Another subtraction operation between the noise power S19 of the noise component S16 and the phase power S20 of the phase revolution component obtained by the phase component extractor 21A can extract the noise power S21 with the power of the phase revolution component removed and then the noise power 25 for a symbol can be calculated by the ½ circuit 46 performing a half-time operation on the noise power S21 for two symbols through differential demodulation.

The signal power S33 with any noise component power removed from the reception symbol S8 can be obtained by subtracting the noise power S25 from the signal power S32 which is a sum of the power values for signal and noise components of the reception symbol S8. Then the ratio of the noise power which contains both the signal power and the noise power to the signal power for a slot, that is, the signal-to-noise power ratio S35 can be generated from the signal power S33 and the inverse S34 of the signal power S32 of the reception symbol S8 containing the power of noise components. The reception signal power S10 for only signal components of a desired wave with the power for noise components of the reception signal S6 removed can be obtained by multiplying thus obtained signal-to-noise power ratio S35 by the reception signal power S9 of the RF signal provided by the reception circuit 15.

The mobile telephone 3 can obtain the reception signal power S10 from an average for several slots and thereby obtain a stable reception signal power and path loss with an even variation between slots. Thus calculated reception signal power and path loss are notified to the base station 2 through the transmission device 8 and therefore, the base station 2 can quickly and properly select a possible base station to which the mobile station should be handed off, based on the reception signal power S10 and the path loss LO obtained by the mobile station.

According to the above configuration, even when a time lag occurs in the reception signal S6 of the control channel signal $S_{CCH}$ due to superimposed noise components such as interference waves on the transmission line, fading, or deviation of windowing by the fast Fourier transform operation and the time lag appears as a phase revolution, the phase revolution can be detected by complex-multiplying the reception symbol S13 which is extracted through demodulation of the reception signal S6 by a conjugate value of the reference $S_{ref}$ read out from the reference storage circuit 33. Based on the phase revolution information, a time alignment operation can be accomplished to correct an incorrect transmission/reception timing with the base station 2 which transmits the transmission signal S5.

The signal power S33 for only signal components of the reception symbol S8 can be calculated by using the phase component extractor 21A to obtain the noise power S20 due to phase revolution of the reception symbol S8, removing the noise component due to phase revolution from the noise power S19 to obtain the noise power S21, and subtracting it from the signal power S32 and thereby the signal-to-noise power ratio S35 of the reception signal S8 can be generated exactly. Therefore, the reception signal power S10 for only signal components of a desired wave signal with the power for noise components of the reception signal S6 removed can be calculated at a higher degree of accuracy.

Since an incorrect signal transmission/reception timing can be corrected instantaneously through a time alignment operation based on the phase information S11, the communication line can be synchronized quickly and the handoff process between the base station and the mobile station can be performed quickly and properly based on a path loss of the received transmission signal S5 consisting of control information thus obtained and transmitted from the base station 2.

(2) Second Embodiment
(2-1) Configuration of the Second Embodiment

Figure 11:
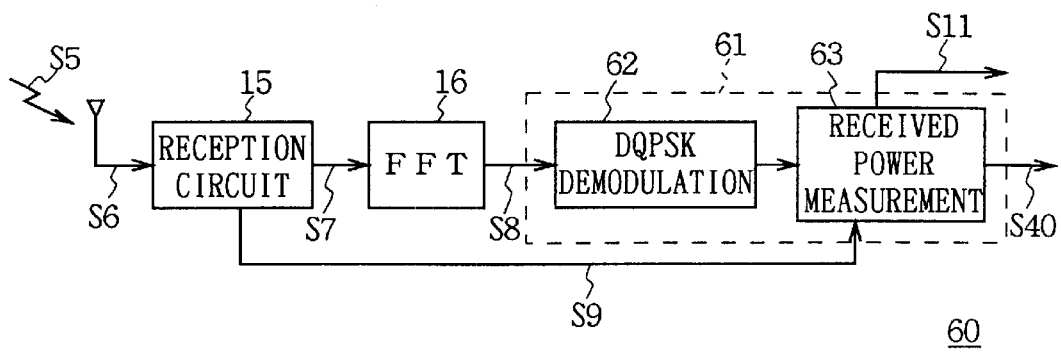
FIG. 11 is a block diagram showing the configuration of a reception device according to the second embodiment.

In FIG. 11, the same reference numbers are used to indicate elements similar to those in FIG. 7. In the figure, the reference numeral 60 shows in whole a reception device according to the second embodiment. The reception signal S6 received through a reception circuit 15 is subjected to a Fourier transform operation by a fast Fourier transform circuit 16 and then demodulated by the succeeding demodulation circuit 61. In the demodulation circuit 61, a DQPSK demodulation circuit 62 performs a DQPSK demodulation operation according to the modulation operation at the transmitting end and a received power measurement circuit 63 detects a received power S40 of the control channel signal $S_{CCH}$ transmitted by each base station through the control channel CCH and the phase information S11 of the control channel signal $S_{CCH}$ and provides them to the succeeding control device 9 (FIG. 4).

Figure 12:
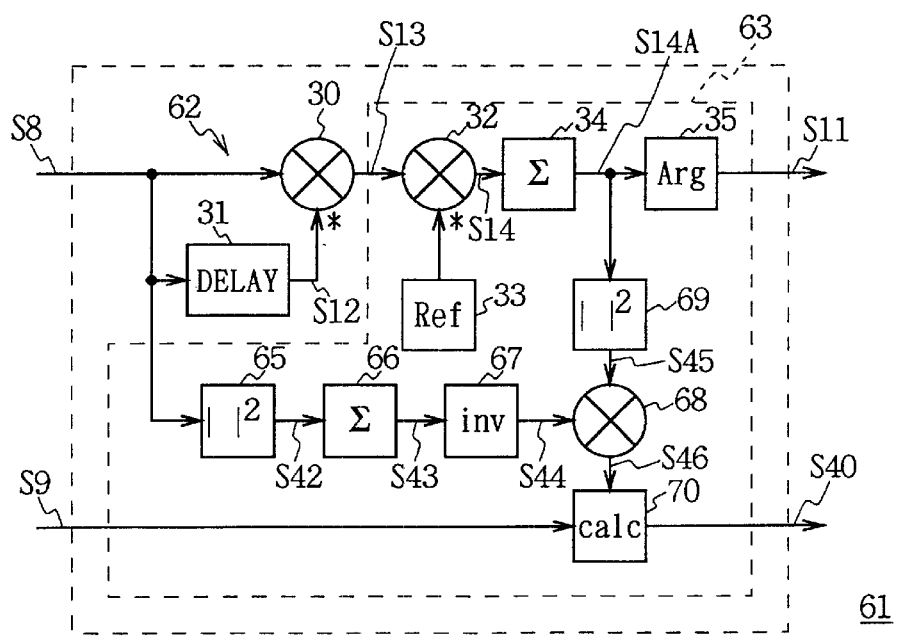
FIG. 12 is a block diagram showing the configuration of a demodulation circuit shown in FIG. 10.

As shown in FIG. 12, like the demodulation circuit 17 according to the first embodiment, the demodulation circuit 61 complex-multiplies the reception symbol string S8 consisting of complex signals supplied by the fast Fourier transform circuit 16 by a conjugate value (which is shown by "*" in the figure) of the reception symbol S12 for the previous symbol in the DQPSK demodulation circuit 62 to extract the QPSK-modulated reception symbol S13.

After the reception symbol S13 extracted by the multiplier 30 is provided to the received power measurement circuit 63, like the demodulation circuit 17 according to the first embodiment, the Arg 35 calculates the phase information S11 of phase revolution components from the reception symbol S8 and provides it to the succeeding control device 9 (FIG. 4). Thereby an incorrect transmission/reception timing can be detected from the phase revolution components of the reception symbol S8 and like the first embodiment, characteristics of the transmission line such as any noise superimposed on the reception symbol group S8 or fading, influence of interference waves, or deviation of windowing can be estimated by monitoring the symbol string S14 provided by the multiplier 32.

The reception symbol string S8 is also provided to a power calculation circuit 65 of the received power measurement circuit 63 to calculate a signal power S42 of the reception symbol S8. Then the succeeding adder 66 cumulatively adds the signal power S42 for a slot to obtain a received power S43, which is provided as an inverse S44 to a multiplier 68 through an inverse calculation circuit 67. The multiplier 68 receives the phase revolution component S14A cumulatively added by the adder 34 as a phase component power S45 through a power calculation circuit 69. The multiplier 68 multiplies all the received power S43 for a slot of the reception symbol string S8 by the phase component power S45 of noise components due to phase revolution of the reception symbol string S8 and provides the multiplication result as a correlation value S46 of phase revolution noise components with respect to signal components. The correlation value S46 is provided to a correlation value table (calc) 70. The correlation value table 70 also receives from the reception circuit 15 the reception signal power S9 of an RF signal which has not been gain-controlled.

The correlation value table 70 has previously stored a correlation value S49 corresponding to a received power value and by using this table as a translation table, the reception signal power S40 which is predictable through a table reference can be obtained from the correlation value S46 corresponding to the reception signal power S9. Thus obtained reception signal power S40 is provided to the succeeding control device 9 to measure a path loss like in the first embodiment.

(2-2) Operation and Effects of the Second Embodiment

With the above configuration, the reception signal S6 received by the reception circuit 15 through a predetermined control channel CCH at a reception timing of the control channel signal $S_{CCH}$ is subjected to a Fourier transform operation by the fast Fourier transform circuit 16 and then demodulated to the reception symbol S13 by the succeeding demodulation circuit 61. In the received power measurement circuit 63, the reception symbol S13 is complex-multiplied by the reference $S_{ref}$ read out from the reference storage circuit 33 to obtain the phase revolution component S14 of reception symbol S13.

In the demodulation circuit 61, thus obtained phase revolution component S14 is cumulatively added to detect an incorrect transmission/reception timing of the control channel signal $S_{CCH}$ based on the phase information S11 for a slot with the amplitude normalized. Thereby like in the first embodiment, a time alignment operation can be accomplished to correct an incorrect transmission/reception timing due to characteristics of the transmission line such as any noise superimposed on the transmission signal S5 of the control channel signal $S_{CCH}$ during the transmission operation from the base station 2 which transmits the transmission signal S5 or fading, influence of interference waves, or deviation of windowing.

At the same time, the reception symbol string S8 is also provided to the power calculation circuit 65 of the received power measurement circuit 63 to calculate the signal power S42 of the reception symbol S8. To obtain the received power S43 for a slot of the signal power S42, the inverse S44 of the received power S43 is multiplied by the phase component power S45 obtained through the power calculation circuit 69 and thereby the correlation value S46 of phase revolution noise components with respect to all signal components containing noise components of the reception symbol string S8 can be obtained.

The reception signal power S40 which allows for phase revolution noise components of the reception signal power S9 of an RF signal provided to the correlation value table 70 can be obtained from the correlation value S46 through a table reference. Thereby any path loss can be measured with the reception signal power S40 and thus the same effects as the first embodiment can be achieved with a simpler configuration.

According to the above configuration, any incorrect transmission/reception timing of the control cannel signal $S_{CCH}$ can be detected based on the phase information S11 and therefore, like in the first embodiment, a time alignment operation can be accomplished to correct an incorrect transmission/reception timing due to characteristics of the transmission line such as any noise superimposed on the transmission signal S5 of the control channel signal $S_{CCH}$ during the transmission operation from the base station 2 which transmits the transmission signal S5 or fading, influence of interference waves, or deviation of windowing so that the communication line can be synchronized.

In addition, the reception signal power S40 which allows for phase revolution noise components of the reception signal power S9 of an RF signal can be obtained through a table reference from the correlation value S46 obtained by multiplying the received power S43 for a slot of the reception symbol string S8 by the phase component power S45. Thereby any path loss can be measured by calculating the reception signal power S40 which allows for noise components due to phase revolution of the reception signal S6 and thus the same effects as the first embodiment can be achieved with a simpler configuration.

(3) Other Embodiments

In the above embodiments, the present invention is applied to a radio communication system according to the TDMA scheme such as a cellular radio communication system. However, the present invention is not limited to such a system but it can find wide application in evaluating any influence of noise power of interference waves on the power of a desired signal wave when the interference waves are superimposed on the desired signal wave to be received. Thus such an alternative embodiment can achieve the same effects as those of the above embodiments.

In the above embodiments, signals are DQPSK-modulated and DQPSK-demodulated according to the TDMA (time division multiple access) scheme. However, the present invention is not limited to such a scheme but also in another system, for example, a synchronous modulation/demodulation system, if the transmission/reception timing is correct, the received power of an RF signal can be calculated at a higher degree of accuracy by complex-multiplying the reception symbol S8 by the reference $S_{ref}$ to extract noise components from the reception symbol and then to extract signal components only. Thus such an alternative embodiment can achieve the same effects as those of the above embodiments.

In the above embodiments, the received power is measured when a transmission signal transmitted by the transmission device 4 of the base station 2A or 2B at the transmitting end is received by the reception device 8 of the mobile telephone 3 which is a mobile station. However, the present invention is not limited to such a measurement method but the received power can be measured also when a transmission signal transmitted by the transmission device 7 of the mobile station is received by the reception device 5 of the base station. Thus such an alternative embodiment can have an advantage that the reception signal power can be measured at a higher degree of accuracy.

In the above embodiments, the demodulation circuit 17 uses the 1/x circuits 40, 42, and 50 to obtain the noise component power with respect to the desired wave signal power for each symbol from the power value cumulatively added for a slot by the adders 34, 39, and 49. However, the present invention is not limited to such a calculation method but the noise component power can be obtained with respect to the desired wave signal power for each slot. Thus such an alternative embodiment can achieve the same effects as those of the above embodiments.

In the above embodiments, the present invention is applied to a radio communication system according to so-called multicarrier communication technology wherein information to be transmitted is divided onto a plurality of subcarriers for superimposition and the plurality of subcarriers are transmitted. However, the present invention is not limited to such a system but in other communication systems, the received power of extracted noise components can be measured by receiving a control symbol with known signal information such as amplitude and phase and comparing the reception condition of the control symbol with the reference $S_{ref}$ in the demodulation circuits 17 and 61 as described above. Thus such an alternative embodiment can achieve the same effects as those of the above embodiments.

As described above in detail, according to the present invention, a communication terminal device, a cellular radio communication system, and an information communication method which can measure the reception conditions from control information at a higher degree of accuracy can be achieved by receiving a transmission signal of the information symbol groups composed of control information transmitted through a predetermined frequency channel, demodulating the reception signal to extract noise components separated from signal components by comparing the control information with reference information used as a reference for comparison, and measuring the reception condition of only the signal components of the transmission signal based on the noise components.

While there has been described in connection with the preferred embodiments of the invention, it will be obvious to those skilled in the art that various changes and modifications can be aimed, therefore, to cover in the appended claims all such changes and modifications as fall within the true spirit and scope of the invention.

What is claimed is:

1. A communication terminal device for receiving a transmission signal including information symbol groups which are generated by sorting information bits into predetermined information units in a transmission device, said communication terminal device comprising:

a reception device configured to receive said information symbol groups of control information transmitted through a predetermined frequency channel, said frequency channel including plural subcarriers allocated to one user, a demodulator configured to demodulate the reception signal to extract said control information, a reference storage device configured to store reference information used as a reference for comparison to identify said control information, a noise component extraction device configured to compare said control information with said reference information to extract noise components from signal components of said control information, and a reception condition measurement device configured to measure the reception condition of said transmission signal based on said noise components extracted by said noise component extraction means.

2. The communication terminal device according to claim 1, further comprising:

a selection means for selecting an appropriate transmission device to couple said communication terminal device and a communication line, from among a plurality of transmission devices, based on said reception condition measured by said reception condition measurement device.

3. The communication terminal device according to claim 1, wherein:

said noise component extraction device is configured to extract phase revolution components of said received information symbol groups with respect to the phase of said reference information.

4. The communication terminal device according to claim 1, wherein:

said reception device is configured to receive said transmission signal synchronously at a predetermined reception timing, said transmission signal including said information symbol groups of user information and said information symbol groups of said control information and transmitted at a predetermined time-divisional transmission timing by said transmission device through said frequency channel, and is configured to extract said user information and said control information through time-division technology.

5. The communication terminal device according to claim 1, further comprising:

means for receiving at the receiving end said transmission signal, which is generated by performing a differential modulation operation on said information symbol groups and is transmitted in said transmission device, means for extracting said information symbol groups after performing a differential demodulation operation on said reception signal, and means for separating and extracting said user information and said control information from said information symbol groups.

6. The communication terminal device according to claim 1, wherein:

said reception device is configured to change a frequency channel for reception according to said frequency channel when said frequency channel used for signal transmission is changed for each of said information symbol groups in said transmission device.

7. The communication terminal device according to claim 1, wherein:

said information symbol groups include a control channel signal transmitted over a period longer than one time slot.

8. The communication terminal device according to claim 1, further comprising:

power calculation means for calculating the power of signal components of said control information, wherein said power calculation means calculates an average by performing several measurements of said power for each of plural frequency channels, the plural frequency channels including the preselected frequency channel, and said communication terminal device notifies the originating transmission device of said average.

9. The communication terminal device according to claim 3, further comprising:

means for measuring a reception timing difference of the reception signal based on said phase revolution components, and means for synchronizing the transmission/reception timing with said transmission device based on said reception timing difference.

10. A communication terminal device for receiving a transmission signal including information symbol groups which are generated by sorting information bits into predetermined information units in a transmission device, said communication terminal device comprising:

a reception device configured to receive said information symbol groups of control information transmitted through a predetermined frequency channel, said frequency channel including plural subcarriers allocated to one user, a demodulator configured to demodulate the reception signal to extract said control information, a reference storage device configured to store reference information used as a reference for comparison to identify said control information, a correlation value calculation device configured to calculate a correlation value by comparing said control information with said reference information, and a reception condition measurement device configured to measure the reception condition of said transmission signal based on said correlation value calculated by said correlation value calculation means.

11. The communication terminal device according to claim 10, further comprising:

a selection means for selecting an appropriate transmission device to couple said communication terminal device and a communication line, from among a plurality of said transmission devices, based on said reception condition measured by said reception condition measurement means.

12. A cellular radio communication system comprising:

a base station which has a transmission device configured to transmit a transmission signal including information symbol groups generated by sorting information bits into predetermined information units and which is provided in each of a plurality of cells formed by dividing a predetermined communication area into cells of a desired size, and a mobile station comprising a reception device configured to receive said information symbol groups of control information transmitted through a predetermined frequency channel, said frequency channel including plural subcarriers allocated to one user, a demodulator configured to demodulate the reception signal to extract said control information, a reference storage device configured to store reference information used as a reference for comparison to identify said control information, a noise component extraction device configured to separate and extract noise components from signal components of said control information by comparing said control information with said reference information, and a reception condition measurement device configured to measure the reception condition of said transmission signal based on said noise components extracted by said noise component extraction means.

13. The cellular radio communication system according to claim 12, further comprising:

a selection means for selecting an appropriate base station to connect said mobile station and a communication line, from among a plurality of said base stations, based on said reception condition measured by said reception condition measurement device.

14. The cellular radio communication system according to claim 12, wherein:

said noise component extraction device is configured to extract phase revolution components of said received information symbol groups with respect to the phase of said reference information.

15. The cellular radio communication system according to claim 12, wherein:

said base station is configured to transmit said transmission signal at a predetermined time-divisional transmission timing through said frequency channel, said transmission signal including said information symbol groups of user information and said information symbol groups of said control information, and said mobile station is configured to receive said transmission signal synchronously at a predetermined reception timing and to extract said user information and said control information through time-division technology.

16. The cellular radio communication system according to claim 12, further comprising:

means for transmitting said transmission signal by performing a differential modulation operation on said information symbol groups in said base station, means for receiving said transmission signal in said mobile station, means for extracting said information symbol groups by performing a differential demodulation operation on the reception signal, and means for separating and extracting said user information and said control information from said information symbol groups.

17. The cellular radio communication system according to claim 12, wherein:

said mobile station is configured to change a frequency channel for reception when said frequency channel used for signal transmission is changed for each of said information symbol groups in said base station.

18. The cellular radio communication system according to claim 12, wherein:

said mobile station is configured to receive said information symbol groups transmitted by said base station through multicarrier modulation technology.

19. The cellular radio communication system according to claim 12, further comprising:

a power calculation means for calculating the power of signal components of said control information, wherein said power calculation means calculates an average by performing several measurements of said power for each of plural frequency channels, and means for notifying the base station of said average.

20. The cellular radio communication system according to claim 14, further comprising:

means for measuring a reception timing difference of the reception signal in said mobile station based on said phase revolution components, and means for synchronizing the transmission/reception timing with said base station based on said reception timing difference.

21. A cellular radio communication system comprising:
- a base station which has a transmission device configured to transmit a transmission signal including information symbol groups generated by sorting information bits into predetermined information units and which is provided in each of a plurality of cells formed by dividing a predetermined communication area into cells of a desired size, and
- a mobile station comprising:
- a reception device configured to receive said information symbol groups of control information transmitted through a predetermined frequency channel, said frequency channel including plural subcarriers allocated to one user,
- a demodulator configured to demodulate the reception signal to extract said control information,
- a reference storage device configured to store reference information used as a reference for comparison to identify said control information,
- a correlation value calculation device configured to calculate a correlation value by comparing said control information with said reference information, and
- a reception condition measurement device configured to measure the reception condition of said transmission signal based on said correlation value calculated by said correlation value calculation means.

22. The cellular radio communication system according to claim 21, further comprising:
- selection means for selecting an appropriate base station to connect said mobile station and a communication line, from among a plurality of said base stations, based on said reception condition measured by said reception condition measurement device.

23. An information communication method for receiving at the receiving end a transmission signal including information symbol groups which are generated by sorting information bits into predetermined information units at the transmitting end, comprising:
- receiving at said receiving end said information symbol groups of control information transmitted from said transmitting end through a predetermined frequency channel, said frequency channel including plural subcarriers allocated to one user,
- demodulating the reception signal to extract said control information,
- separating and extracting noise components from signal components of said control information by comparing said control information with reference information used as a reference for comparison to identify said control information, and
- measuring the reception condition of said transmission signal based on said extracted noise components.

24. The information communication method according to claim 23, further comprising:
- selecting an appropriate transmitting end to connect said receiving end and a communication line, from among a plurality of said transmitting ends, based on said measured reception condition.

25. The information communication method according to claim 23, wherein said noise extraction step comprises extracting phase revolution components of said received information symbol groups with respect to the phase of said reference information at said receiving end.

26. The information communication method according to claim 23, further comprising:
- transmitting at said transmitting end said transmission signal at a predetermined time-divisional transmission timing through said frequency channel, said transmission signal including said information symbol groups of user information and said information symbol groups of said control information,
- receiving said transmission signal synchronously at said receiving end at a predetermined reception timing, and
- extracting said user information and said control information through time-division technology.

27. The information communication method according to claim 23, further comprising:
- transmitting said transmission signal at said transmitting end, said transmission signal generated by performing a differential modulation operation on said information symbol groups, receiving said transmission signal at said receiving end, and
- extracting said information symbol groups by performing a differential demodulation operation on the reception signal.

28. The information communication method according to claim 23, further comprising:
- changing at said receiving end a frequency channel for reception according to said frequency channel when said frequency channel used for signal transmission is changed for each of said information symbol groups at said transmitting end.

29. The information communication method according to claim 23, further comprising:
- demodulating at said receiving end said information symbol groups transmitted by said transmitting end through multicarrier modulation technology.

30. The information communication method according to claim 23, further comprising:
- calculating the power of signal components of said control information, including calculating an average by performing several measurements of said power for each of said frequency channel,
- wherein said method further comprises notifying said transmitting end which transmits said transmission signal of said average.

31. The information communication method according to claim 25, further comprising:
- measuring a reception timing difference of the reception signal at said receiving end based on said phase revolution components, and
- synchronizing the transmission/reception timing with said transmitting end based on said reception timing difference.

32. An information communication method for receiving at a receiving end a transmission signal including information symbol groups which are generated by sorting information bits into predetermined information units at the transmitting end, comprising:
- receiving at said receiving end said information symbol groups of control information transmitted from said transmitting end through a predetermined frequency channel, said frequency channel including plural sub-carriers allocated to one user, demodulating the reception signal to extract said control information, calculating a correlation value by comparing said control information with reference information used as a reference for comparison to identify said control information, and measuring the reception condition of said transmission signal based on said correlation value.

33. The information communication method according to claim 32, further comprising:

selecting an appropriate transmitting end to connect said receiving end and a communication line, from among a plurality of said transmitting ends, based on said measured reception condition.

* * * * *